United States Patent
Piao et al.

(10) Patent No.: US 10,618,924 B2
(45) Date of Patent: Apr. 14, 2020

(54) METALLOCENE COMPOUND AND PREPARATION METHOD THEREFOR

(71) Applicant: Hanwha Chemical Corporation, Seoul (KR)

(72) Inventors: Lan Hua Piao, Seoul (KR); Sung Hae Jun, Gyeonggi-do (KR); Hyun Seung Lee, Daejeon (KR); Dong Wook Jeong, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 73 days.

(21) Appl. No.: 15/743,391

(22) PCT Filed: Feb. 18, 2016

(86) PCT No.: PCT/KR2016/001640
§ 371 (c)(1),
(2) Date: Jan. 10, 2018

(87) PCT Pub. No.: WO2017/010648
PCT Pub. Date: Jan. 19, 2017

(65) Prior Publication Data
US 2018/0201638 A1    Jul. 19, 2018

(30) Foreign Application Priority Data

Jul. 15, 2015 (KR) .......... 10-2015-0100232

(51) Int. Cl.
*C07F 17/00* (2006.01)
*C08F 210/16* (2006.01)

(52) U.S. Cl.
CPC ............ *C07F 17/00* (2013.01); *C08F 210/16* (2013.01)

(58) Field of Classification Search
CPC ........... C07F 7/00; C07F 17/00; C08F 210/16
See application file for complete search history.

(56) References Cited

U.S. PATENT DOCUMENTS

| 5,883,275 A * | 3/1999 | Bingel .................. C07F 17/00 556/9 |
| 6,051,728 A | 4/2000 | Resconi et al. |
| 7,619,106 B2 | 11/2009 | Damrau et al. |

FOREIGN PATENT DOCUMENTS

| CN | 1182089 A | 5/1998 |
| EP | 1152006 A2 | 11/2001 |
| EP | 1213295 A2 | 6/2002 |
| EP | 3037167 A1 | 6/2016 |
| KR | 1019980033354 A | 7/1998 |
| KR | 100418106 B1 | 4/2004 |
| KR | 1020050115270 A | 12/2005 |
| KR | 1020140121766 A | 10/2014 |
| KR | 1020150045369 A | 4/2015 |
| KR | 1020150066484 A | 6/2015 |

OTHER PUBLICATIONS

Klosin et al., "Synthesis and X-ray Structure of Novel 2- and 3-Herteroatom-Substituted Ansa-Zirconocene Complexes", Journal of Organometallic Chemistry, 2009, vol. 694, pp. 2581-2596.
Thomas et al., "Novel Octahydro- and Tetrahydro-Fluorenyl Containing $C_1$ Symmetric Zirconocenes for the Stereoregular Polymerization of Propylene" Journal of Organometallic Chemistry, 2001, vol. 631, pp. 29-35.
Thomas et al., "Synthesis of Novel Tetrahydrofluorenyl-Containing Group IV Metallocenes for the Zieger-Natta type Polymerization of α-Olefins" Organometallics, 2000, vol. 19, pp. 5744-5749.
Extended European Search Report for European Application No. 16824566.0, dated Jan. 14, 2019, 9 pages.
International Search Report issued in PCT/KR2016/001640 dated Jun. 7, 2016, 7 pages.
Chinese Office Action with Search Report for Chinese Application No. 201680041372.6, dated Nov. 27, 2019, 9 pages.

* cited by examiner

*Primary Examiner* — Robert D Harlan
(74) *Attorney, Agent, or Firm* — RatnerPrestia

(57) ABSTRACT

A preparation method for a metallocene compound is provided. The method includes: stirring at least one compound I among compounds expressed by the following chemical formula (I) and a hydrogenation reaction catalyst of 0.10 to 0.55 parts by weight based on 100 parts by weight of the compound I under a hydrogen atmosphere; and obtaining a metallocene compound containing at least one first compound among the compounds expressed by the following chemical formula (1). Chemical formula (I) and (1) are provided in the specification.

18 Claims, 3 Drawing Sheets

US 10,618,924 B2

METALLOCENE COMPOUND AND PREPARATION METHOD THEREFOR

CROSS REFERENCE TO RELATED APPLICATIONS

This application is the U.S. National Phase Application of PCT/KR2016/001640, filed Feb. 18, 2016, which claims priority to Korean Patent Application No. 10-2015-0100232, filed Jul. 15, 2015, the contents of such applications being incorporated by reference herein.

FIELD

The present invention relates to a metallocene compound and a preparation method therefor.

BACKGROUND

Unlike the conventional Ziegler-Natta catalyst, a polymer polymerized with a metallocene catalyst exhibits a narrow molecular weight distribution as a polymer grows at a single active point, and has an advantage of excellent mechanical properties. On the basis of such excellent properties, the area of the metallocene catalyst gradually expands in the polyethylene (PE) and polypropylene (PP) industry.

SUMMARY

The present invention provides a novel metallocene compound and a preparation method therefor.

The present invention can provide a novel metallocene compound.

The effects of the present invention are not limited by the contents exemplified above, and various effects are further included in this specification.

DETAILED DESCRIPTION OF THE INVENTION

Figure 1:
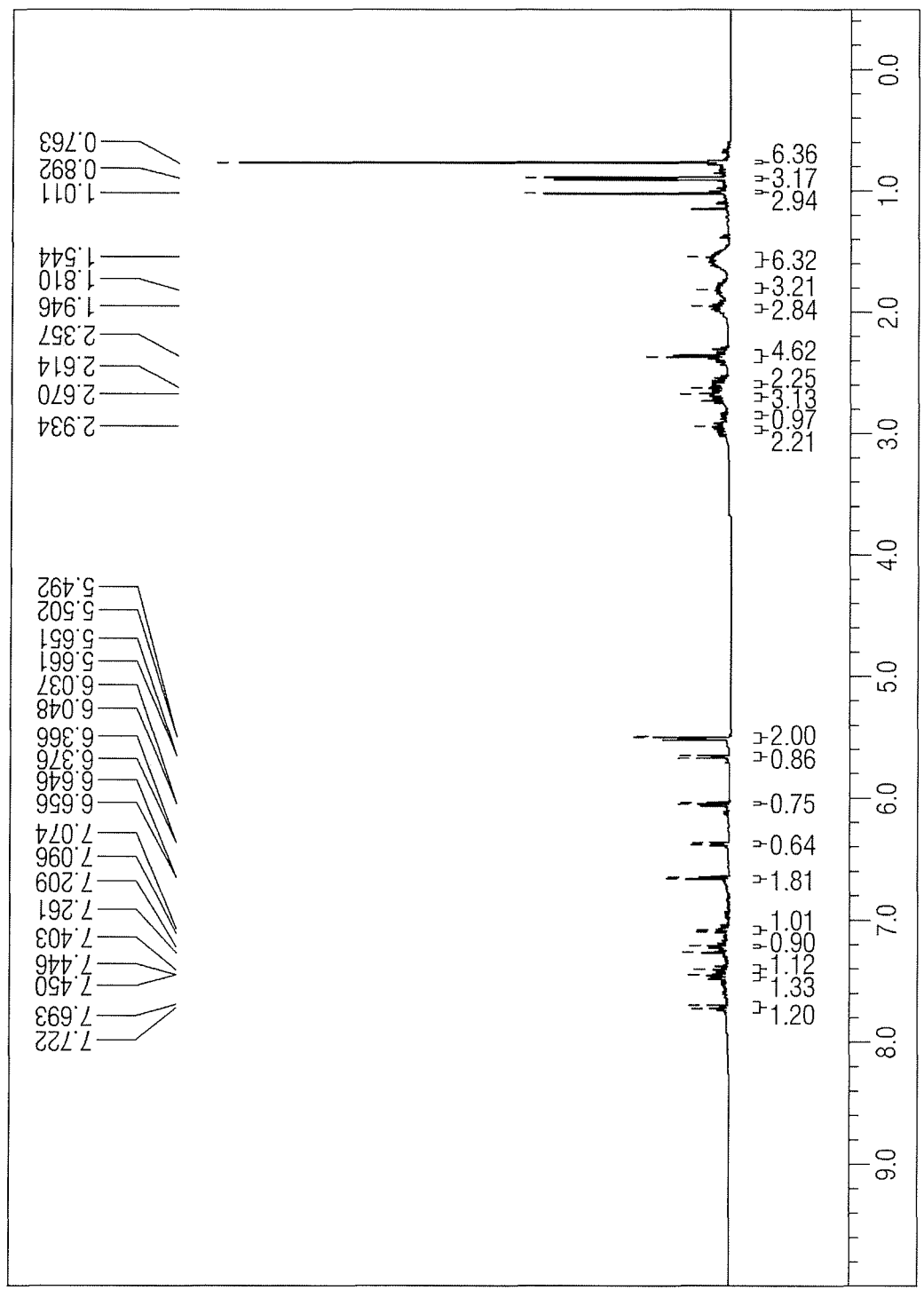
FIG. 1 is a $^1$H-NMR analysis spectrum of a metallocene compound according to a first manufacturing example of the invention.

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

As used herein, "alkyl group" includes linear or branched alkyl groups, and may be for example, n-butyl group, t-butyl group and the like. As used herein, a "cycloalkyl group" may be a cyclic alkyl group such as cyclobutyl, cyclopentyl, cyclohexyl, and the like. In the present specification, an "aryl group" is a residue obtained by removing single hydrogen from an aromatic hydrocarbon, and may be, for example, phenyl or the like. In the present specification, an "alkenyl group" is a residue obtained by removing single hydrogen from an unsaturated hydrocarbon containing a carbon-carbon double bond, and may be, for example, (meth) vinyl (which can be expressed as $CH_2=CR_a-$, wherein $R_a$ is hydrogen in vinyl, and $R_a$ is an alkyl group etc. in meth vinyl), (meth) allyl (which can be expressed as $CH_2=CR_b-CH_2-$), wherein $R_b$ is hydrogen in allyl and $R_b$ is an alkyl group etc. in meth allyl.

The preparation method for a metallocene compound according to an embodiment of the present invention is a preparation method for a metallocene compound which includes a step of introducing at least one compound I among compounds expressed by the following chemical formula (I) and a hydrogenation reaction catalyst having 0.10 part by weight to 0.55 parts by weight based on 100 parts by weight of the compound I into a reactor and stirring the mixture of the compound I and the hydrogenation reaction catalyst in a hydrogen atmosphere; and a step of obtaining a metallocene compound containing at least one first compound among the compounds expressed by the following chemical formula (1).

<Chemical Formula (I)>

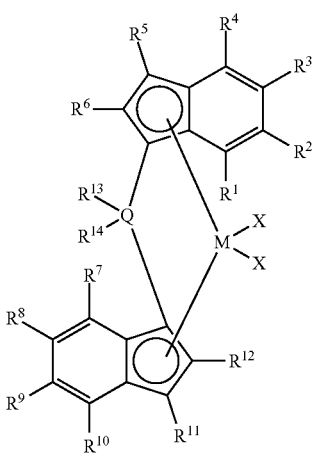

-continued

<Chemical Formula (1)>

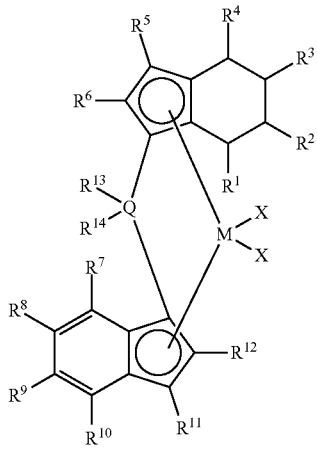

In the chemical formulas (1) and chemical formulas (I), M, Q, X, $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are as follows:

M may be any one of titanium (Ti), zirconium (Zr) or hafnium (Hf). The Q can be any one of carbon (C), silicon (Si), germanium (Ge), or tin (Sn). The X may be independently any one of halogen, an alkyl group having 1 to 10 carbon atoms, and an alkenyl group having 2 to 10 carbon atoms.

The $R^1$, $R^2$, $R^3$, $R^4$, $R^5$, $R^6$, $R^7$, $R^8$, $R^9$, $R^{10}$, $R^{11}$, and $R^{12}$ satisfy the following (i) or (ii).

(i) $R^1$, $R^2$, $R^3$, $R^4$, $R^5$, $R^6$, $R^7$, $R^8$, $R^9$, $R^{10}$, $R^{11}$, and $R^{12}$ each may be independently any one of hydrogen, an alkyl group having 1 to 20 carbon atoms, a cycloalkyl group having 3 to 6 carbon atoms and an aryl group having 6 to 14 carbon atoms.

(ii) Among $R^m$ (m is an integer of 1 to 12), two adjacent $R^n$ and $R^{n+1}$ (n is an integer from 1 to 11) are connected to each other to form a monocyclic or polycyclic rings having 3 to 15 carbon atoms in which the alkyl group having 1 to 4 carbon atoms is substituted or not substituted, and at this time, the remaining $R^m$ except $R^n$ and $R^{n+1}$ may independently be any one of hydrogen, an alkyl group having 1 to 20 carbon atoms, a cycloalkyl group having 3 to 6 carbon atoms and an aryl group having 6 to 14 carbon atoms.

Each of $R^{13}$ and $R^{14}$ may independently be an alkyl group having 1 to 10 carbon atoms or an aryl group having 6 to 14 carbon atoms.

In (ii), a monocyclic ring having 3 to 15 carbon atoms substituted with an alkyl group having 1 to 4 carbon atoms is a monocyclic ring formed by connection of the two adjacent $R^n$ and $R^{n+1}$ (n is an integer of 1 to 11) from $R^m$ (m is an integer of 1 to 12), and may or may not contain an unsaturated bond. In the present specification, the term "aromatic monocyclic ring" is a monocyclic ring containing an unsaturated bond, and the term "aliphatic monocyclic ring" is a monocyclic ring which does not contain an unsaturated bond and is made up of a saturated bond. Further, a polycyclic ring having 3 to 15 carbon atoms substituted with an alkyl group having 1 to 4 carbon atoms is a ring in which two adjacent $R^n$ and $R^{n+1}$ (n is an integer from 1 to 11) are connected to each other from the $R^m$ (m is an integer of 1 to 12) and two or more rings are joined together while sharing two or more common elements, and may or may not contain a unsaturated bond. In the present specification, the term "aromatic polycyclic ring" is a polycyclic ring containing an unsaturated bond, and includes a structure in which the aromatic monocyclic rings are joined while sharing two or more common elements, and a structure in which the aromatic monocyclic rings are joined while sharing two or more common elements, and the term "aliphatic polycyclic ring" is a polycyclic ring which does not contain unsaturated bond and is made up of a saturated bond.

The compound I is a starting material for preparing the metallocene compound. The first compound can be generated by a partial hydrogenation reaction of the compound I. The compound I can be a bisindenyl-based metallocene compound, and the first compound can be an indenyl-tetrahydroindenyl-based metallocene compound. The indenyl-tetrahydroindenyl-based metallocene compound can be generated by the partial hydrogenation reaction of the bis-indenyl-based metallocene compound. The hydrogenation reaction catalyst can be used in an amount necessary for the partial hydrogenation reaction of compound I, and can be used, for example, in the range of 0.10 to 0.55 parts by weight based on 100 parts by weight of compound I.

The hydrogenation reaction catalyst may contain at least one metal among, for example, nickel (Ni), platinum (Pt), ruthenium (Ru), rhodium (Rh) or palladium (Pd). The hydrogenation reaction is a reaction in which hydrogen is added to multiple bonds (double bond, triple bond), nitro group, or carbonyl group with carbon. Because of high flammability and explosion of hydrogen, a catalyst is used to activate hydrogen at a low temperature as far as possible and provide it to the reactants.

Transition metals (Ti, Zr, Cr, Mo, Co, Fe, etc.) having too strong adsorption strength of hydrogen are not suitable for a catalyst for hydrogenation reaction, because hydrogen activated on the surface of the catalyst is hard to be transferred to the reactant. In contrast, transition metals (Mg, Zn, Ag, Si, Pb, etc.) having too weak adsorption strength of hydrogen have a low hydrogenation reaction activity because hydrogen is not sufficiently activated. Therefore, ruthenium (Ru), rhodium (Rh), palladium (Pd) and platinum (Pt) are suitable as catalysts for the hydrogenation reaction, in which the adsorption strength of hydrogen is appropriate and activated hydrogen is easily transferred.

Nickel (Ni) can be used as a catalyst for hydrogenation reaction, in addition to precious metal catalysts such as ruthenium (Ru), rhodium (Rh), palladium (Pd), and platinum (Pt). However, nickel (Ni) has a low catalytic activity and requires a relatively high temperature and high pressure process as compared with a noble metal catalyst for high yield.

In order to utilize an expensive noble metal catalyst to a maximum extent for catalytic reaction, any one or more of the aforementioned noble metals among platinum (Pt), ruthenium (Ru), rhodium (Rh) or palladium (Pd) can be used by being carried on a carrier. The carrier may be, for example, carbon, silica, alumina, zeolite, or the like, but is not limited thereto. Preferably, a palladium-carried catalyst (Pd/C) in which palladium (Pd) is carried on a carbon carrier can be used. The palladium-carried catalyst (Pd/C) may provide a metallocene compound containing a first compound at a higher yield than $PtO_2$.

The stirring of the compound I and the hydrogenation reaction catalyst can be performed in an aromatic solvent which is not halogenated, and the non-halogenated aromatic solvent may be, for example, benzene, toluene, xylene, o-xylene, m-xylene, p-xylene, mesitylene, tetralin, anisole, cumene, 1,2-diethylbenzene, 1,3-diethylbenzene, 1,4-diethylbenzene, 1-ethyl-2-methylbenzene, 1-ethyl-3-methylbenzene, 1-ethyl-4-methylbenzene and the like, and preferably may be anisole, toluene, benzene, and xylene.

Depending on the degree of the partial hydrogenation reaction of the compound I, for example, the time of the partial hydrogenation reaction of the compound I or the content of the hydrogenation catalyst, the metallocene compound may further include at least one of unreacted compound I and at least one second compound among the compounds expressed by formula (2). The second compound is a substance generated as a result of the hydrogenation reaction with the first compound. The second compound may be a bistetrahydroindenyl-based metallocene compound.

<Chemical Formula (2)>

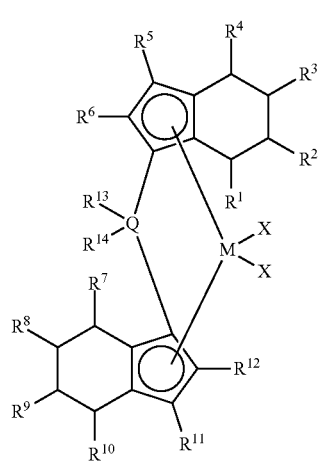

In the chemical formula (2), M, Q, X, $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are as defined in chemical formula (1) and chemical formula (I).

The metallocene compound according to an embodiment of the invention contains the first compound. Further, depending on the degree of the partial hydrogenation reaction of compound I, the metallocene compound may be a composition of the first compound and the second compound, or may be a composition of the first compound, the second compound, and the compound I. At this time, the metallocene compound may contain the first compound and the second compound, or may contain the first compound, the second compound and the compound I, or may contain the first compound and the compound I.

The metallocene compound can be used together with a co-catalyst compound and can be used as a polymerization catalyst for polyolefin. The co-catalyst compound is a well-known co-catalyst compound, but may be, for example, a borate-based compound, or an alkylalumin oxane (e.g., methylaluminoxane), alkylaluminum, alkylboron and the like. However, it is not limited thereto.

For example, at least one of the metallocene compound and the co-catalyst compound can be used in a form of being carried on the carrier. The carrier may be, for example, carbon, silica, alumina, zeolite, magnesium chloride, but is not limited thereto.

As a method of carrying at least one of the metallocene compound and the co-catalyst compound, a known physical adsorption method or a known chemical adsorption method can be used.

The physical adsorption method may be, for example, a method of bringing a solution in which the metallocene compound is dissolved into contact with the carrier and then drying the solution, a method of bringing a solution in which the metallocene compound and the co-catalyst compound are dissolved into contact with the carrier and then drying the solution, or a method of bringing a solution in which the metallocene compound is dissolved into contact with the carrier and then drying the solution to produce a carrier on which the metallocene compound is carried, and a method of bringing a solution in which the co-catalyst compound is dissolved into contact with the carrier and then drying the solution to prepare a carrier on which the co-catalyst compound is carried, and then mixing the solution with the carrier.

The chemical adsorption method may be, for example, a method in which the co-catalyst compound is first carried on the surface of the carrier and then the metallocene compound is carried on the co-catalyst compound, or a method in which the functional group of the surface of the carrier (for example, in the case of silica, hydroxyl group (—OH) on the surface of silicane) and the metallocene compound are covalently bonded with each other.

Meanwhile, the first compound may be, for example, at least one among the compounds expressed by the following chemical formulas (3) to (18). However, the invention is not limited thereto.

<Chemical Formula (3)>

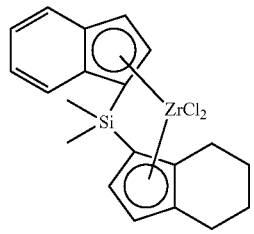

<Chemical Formula (4)>

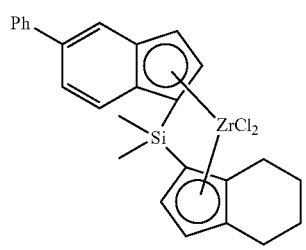

<Chemical Formula (5)>

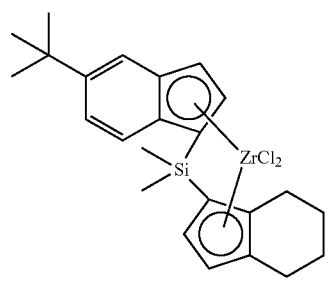

<Chemical Formula (6)>

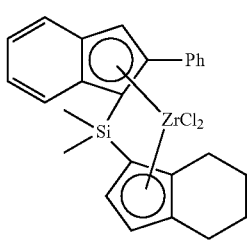

<Chemical Formula (7)>
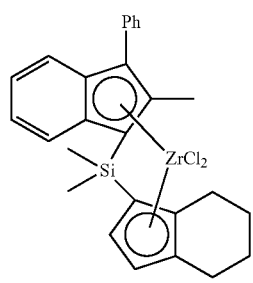
<Chemical Formula (8)>
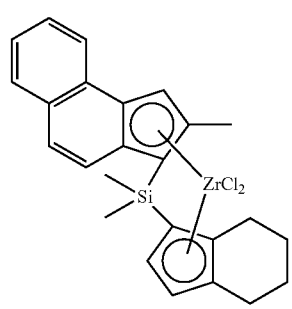
<Chemical Formula (9)>
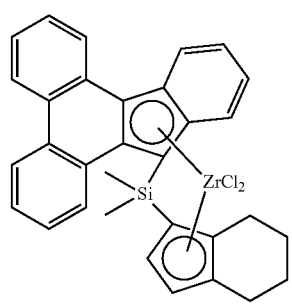
<Chemical Formula (10)>
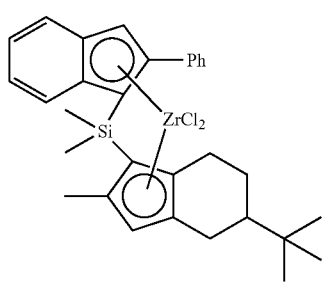
<Chemical Formula (11)>
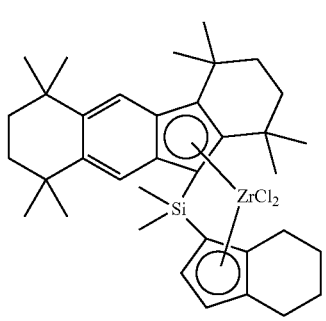
<Chemical Formula (12)>
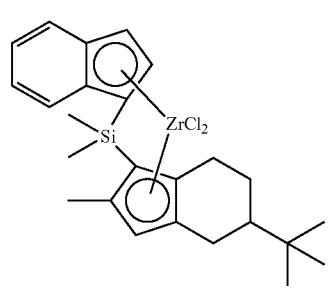
<Chemical Formula (13)>
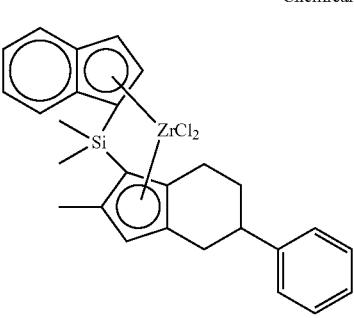
<Chemical Formula (14)>
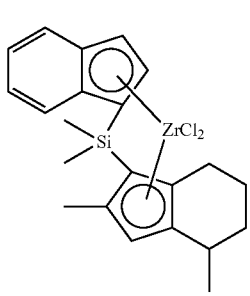
<Chemical Formula (15)>
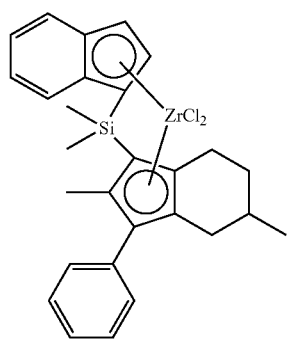
<Chemical Formula (16)>
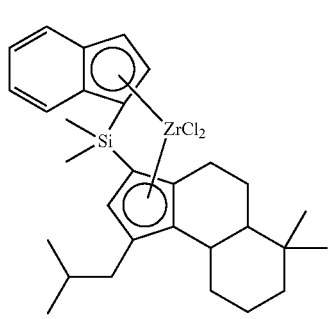

-continued
<Chemical Formula (17)>
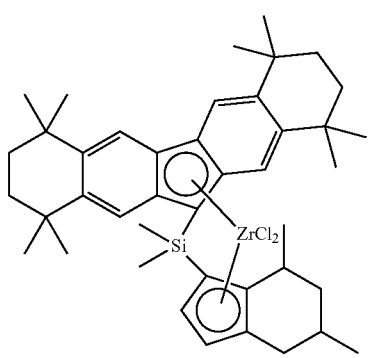
<Chemical Formula (18)>
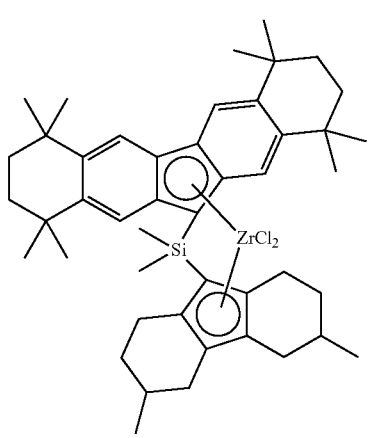
The compound I may be, for example, at least one of the compounds expressed by the following chemical formulas (19) to (34). However, the invention is not limited thereto.
<Chemical Formula (19)>
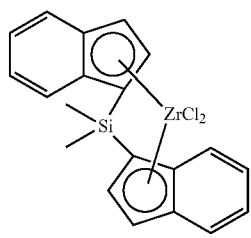
<Chemical Formula (20)>
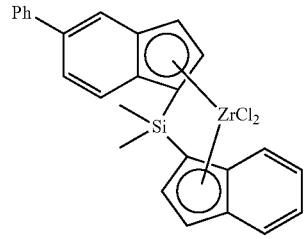
-continued
<Chemical Formula (21)>
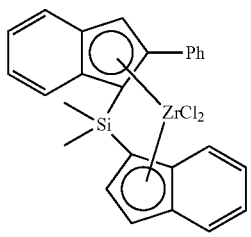
<Chemical Formula (22)>
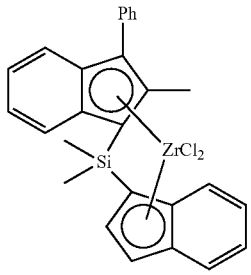
<Chemical Formula (23)>
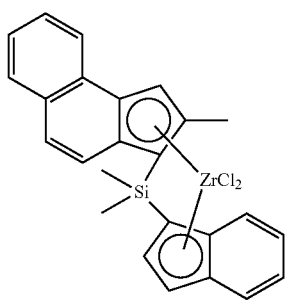
<Chemical Formula (24)>
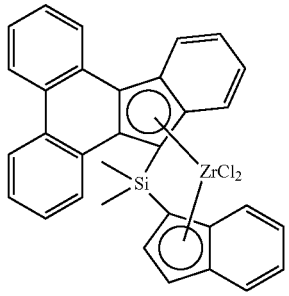
<Chemical Formula (25)>

-continued
<Chemical Formula (26)>
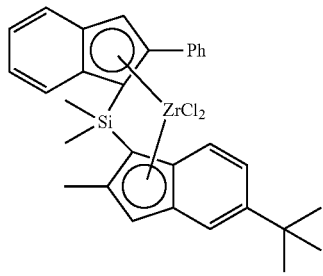
<Chemical Formula (27)>
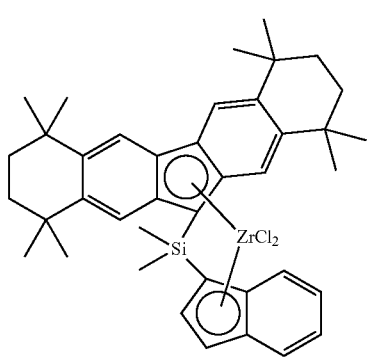
<Chemical Formula (28)>
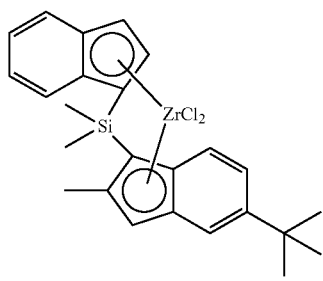
<Chemical Formula (29)>
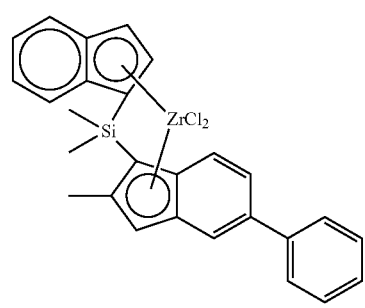
<Chemical Formula (30)>
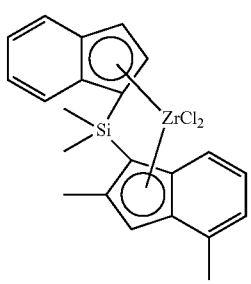
<Chemical Formula (31)>
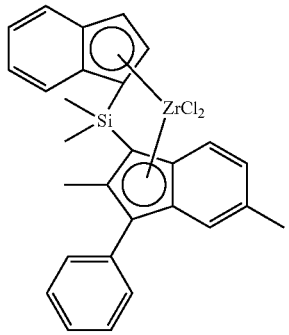
<Chemical Formula (32)>
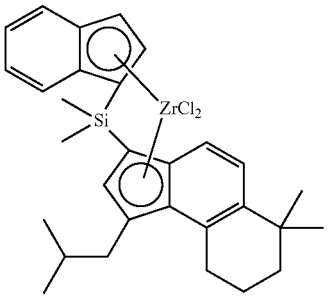
<Chemical Formula (33)>
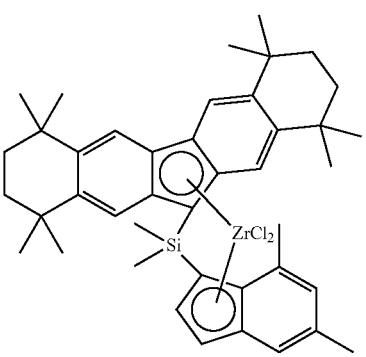
<Chemical Formula (34)>
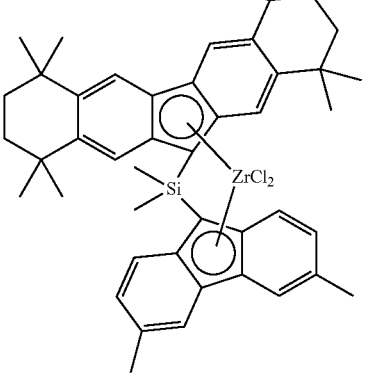
The second compound may be, for example, at least one among the compounds expressed by the following chemical formulas (35) to (50). However, the invention is not limited thereto.

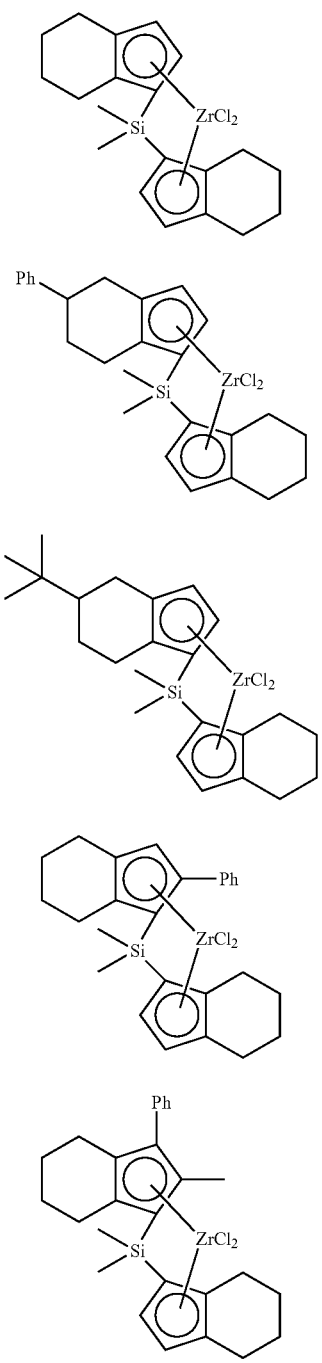
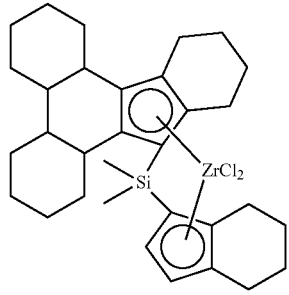
<Chemical Formula (35)>
<Chemical Formula (36)>
<Chemical Formula (37)>
<Chemical Formula (38)>
<Chemical Formula (39)>
<Chemical Formula (40)>
<Chemical Formula (41)>
<Chemical Formula (42)>
<Chemical Formula (43)>
<Chemical Formula (44)>
<Chemical Formula (45)>

<Chemical Formula (46)>

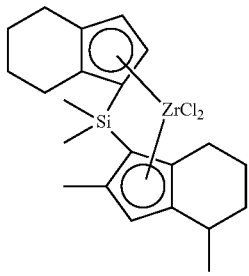

<Chemical Formula (47)>

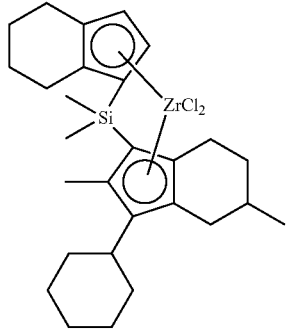

<Chemical Formula (48)>

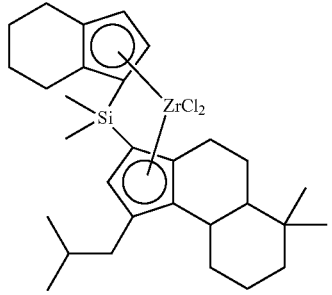

<Chemical Formula (49)>

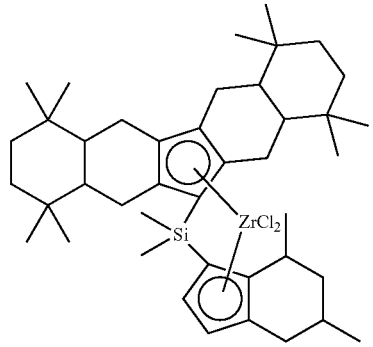

<Chemical Formula (50)>

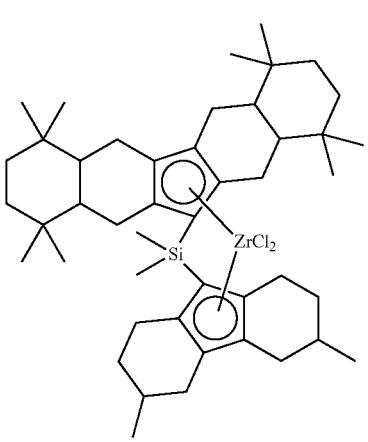

In the chemical formula (I), the alkyl group having 1 to 20 carbon atoms may be hetero alkyl group which has at least one carbon (C) substituted with at least one of oxygen (O), nitrogen (N), and sulfur (S). The monocyclic ring or polycyclic rings having 3 to 15 carbon atoms may be a monocyclic or polycyclic hetero rings having 3 to 15 carbon atoms in which at least one carbon (C) is substituted with at least one of oxygen (O), nitrogen (N), and sulfur (S). At this time, the first compound may be, for example, at least one of the compounds expressed by the following chemical formulas (51) to (54).

<Chemical Formula (51)>

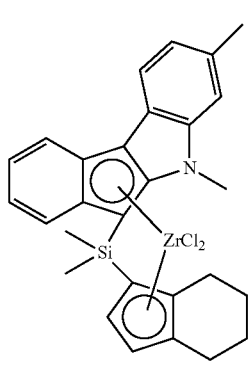

<Chemical Formula (52)>

<Chemical Formula (53)>

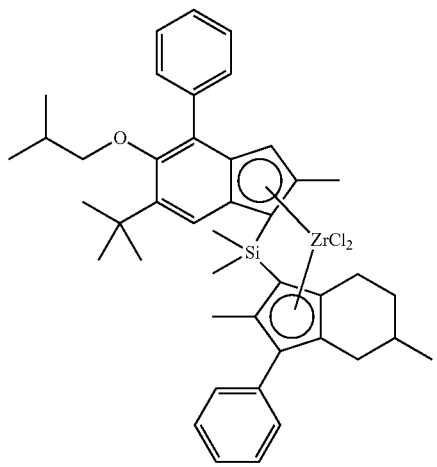

<Chemical Formula (54)>

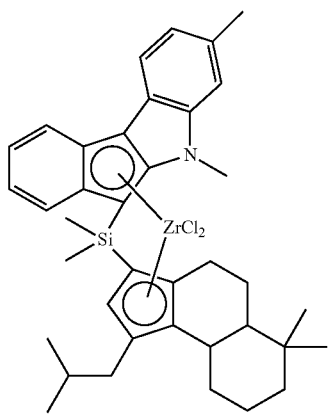

In the chemical formula (I), the alkyl group having 1 to 20 carbon atoms may be hetero alkyl group which has at least one carbon (C) substituted with at least one of oxygen (O), nitrogen (N), and sulfur (S). The monocyclic ring or polycyclic rings having 3 to 15 carbon atoms may be a monocyclic or polycyclic hetero rings having 3 to 15 carbon atoms in which at least one carbon (C) is substituted with at least one of oxygen (O), nitrogen (N), and sulfur (S). At this time, the compound I may be, for example, at least one of the compounds expressed by the following chemical formulas (55) to (58).

<Chemical Formula (55)>

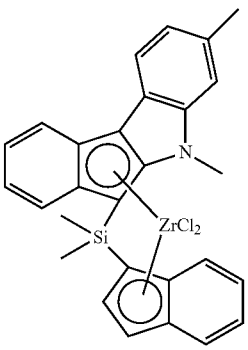

<Chemical Formula (56)>

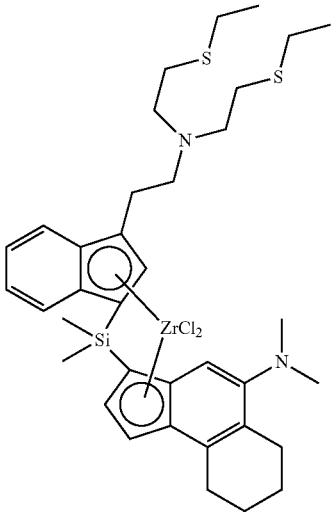

<Chemical Formula (57)>

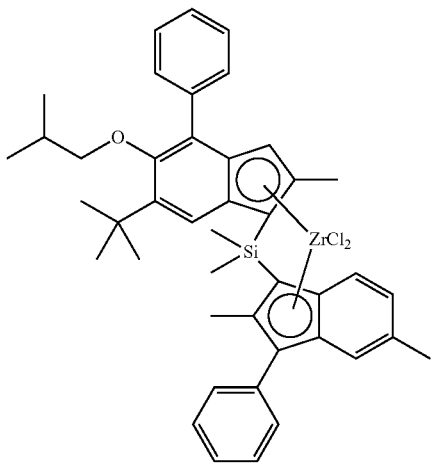

<Chemical Formula (58)>

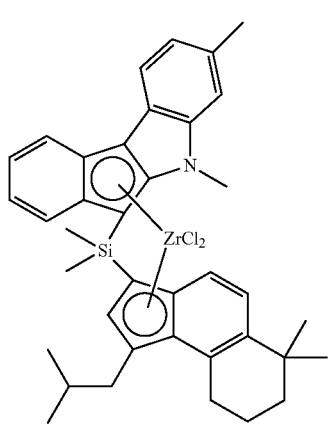

In the chemical formula (2), the alkyl group having 1 to 20 carbon atoms may be hetero alkyl group which has at least one carbon (C) substituted with at least one of oxygen (O), nitrogen (N), and sulfur (S). The monocyclic ring or polycyclic rings having 3 to 15 carbon atoms may be a monocyclic or polycyclic hetero rings having 3 to 15 carbon atoms in which at least one carbon (C) is substituted with at least one of oxygen (O), nitrogen (N), and sulfur (S). At this time, the second compound may be, for example, at least one among the compounds expressed by the following chemical formulas (59) to (62).

<Chemical Formula (59)>

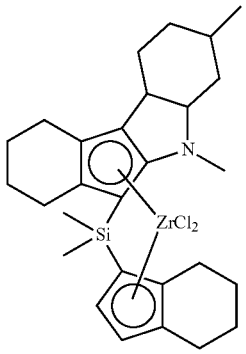

<Chemical Formula (62)>

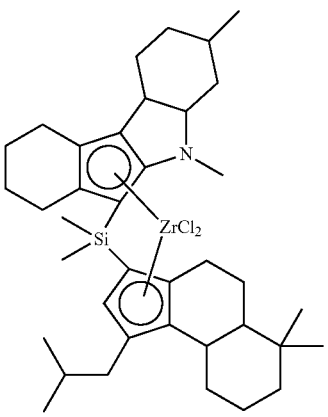

Hereinafter, the present invention will be explained in more detail through specific manufacturing examples and experimental examples of the metallocene compounds.

Manufacturing Example 1

Synthesized at a 1:1 Ratio of Rac-Dimethylsilyl (Indenyl) (Tetrahydroindenyl) Zirconium Dichloride and Rac-Dimethylsilyl Bis (Tetrahydroindenyl) Zirconium Dichloride <Chemical Formula (60)>

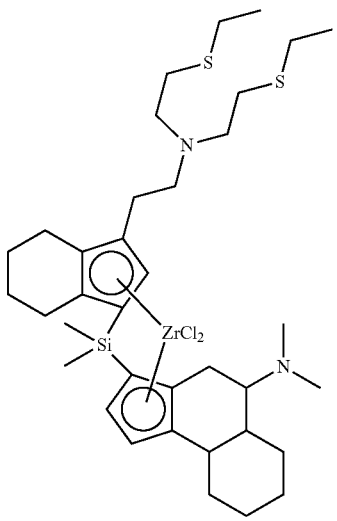

<Reaction Formula 1>

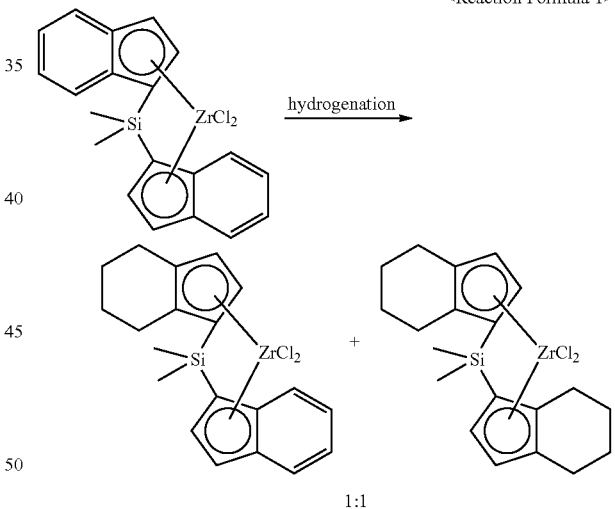

<Chemical Formula (61)>

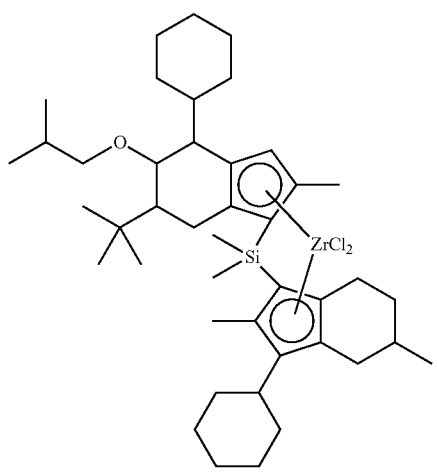

502 mg (1 eq.) of Rac-dimethylsilylenebis (indenyl) zirconium dichloride and a Pd/C solution were placed in a 100 mL autoclave inside a glove box. The Pd/C solution was prepared by dispersing 5 wt % Pd/C 11 mg (0.5 mol %) in toluene of 25 mL. After injecting hydrogen of 30 bar into the autoclave, the mixture was stirred at 70° C. for 14 hours. After the completion of the reaction, the solution in the autoclave was filtered, and the produced transition metal compound crystals were dissolved using toluene of 25 mL and then filtered. The filtered solution was collected and the solvent was removed under vacuum, and then a mixture of Rac-dimethylsilyl (indenyl) (tetrahydroindenyl) zirconium-dichloride and Rac-dimethylsilylbis (tetrahydroindenyl) zirconium dichloride was obtained in 90% yield.

Manufacturing Example 2

1:3 Ratio Synthesis of Rac-Dimethylsilyl (Indenyl) (Tetrahydroindenyl) Zirconium Dichloride and Rac-Dimethylsilyl Bis (Tetrahydroindenyl) Zirconium Dichloride

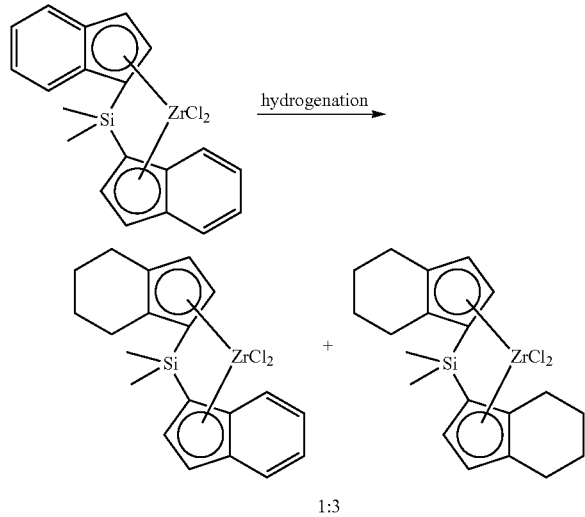

<Reaction Formula 2>

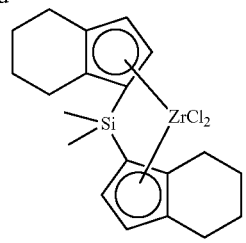

502 mg (1 eq.) of Rac-dimethylsilylenebis (indenyl) zirconium dichloride and a Pd/C solution were placed in a 100 mL autoclave inside a glove box. The Pd/C solution was prepared by dispersing 5 wt % Pd/C 11 mg (0.5 mol %) in toluene of 25 mL. After injecting hydrogen of 30 bar into the autoclave, the mixture was stirred at 70° C. for 16 hours. After the completion of the reaction, the solution in the autoclave was filtered, and the produced transition metal compound crystals were dissolved using toluene of 25 mL and then filtered. The filtered solution was collected and the solvent was removed under vacuum, and then a mixture of Rac-dimethylsilyl (indenyl) (tetrahydroindenyl) zirconiumdichloride and Rac-dimethylsilylbis (tetrahydroindenyl) zirconium dichloride was obtained in 90% yield.

Comparative Example 1

Synthesis of Rac-Dimethylsilyl Bis (Tetrahydroindenyl) Zirconium Dichloride

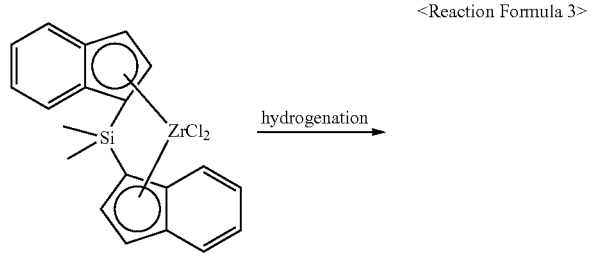

<Reaction Formula 3>

502 mg (1 eq.) of Rac-dimethylsilylenebis (indenyl) zirconium dichloride and a Pd/C solution were placed in a 100 mL autoclave inside a glove box. The Pd/C solution was prepared by dispersing 5 wt % Pd/C 59.5 mg (2.5 mol %) in toluene of 25 mL. After injecting hydrogen of 30 bar into the autoclave, the mixture was stirred at 70° C. for 5 hours. After the completion of the reaction, the solution in the autoclave was filtered, and the produced transition metal compound crystals were dissolved using toluene of 25 mL and then filtered. The filtered solution was collected and the solvent was removed under vacuum, and then 0.91 g (90%) of pale green solid compound Rac-dimethylsilyl bis (tetrahydroindenyl) zirconium dichloride was obtained.

Experimental Example 1

Figure 2:
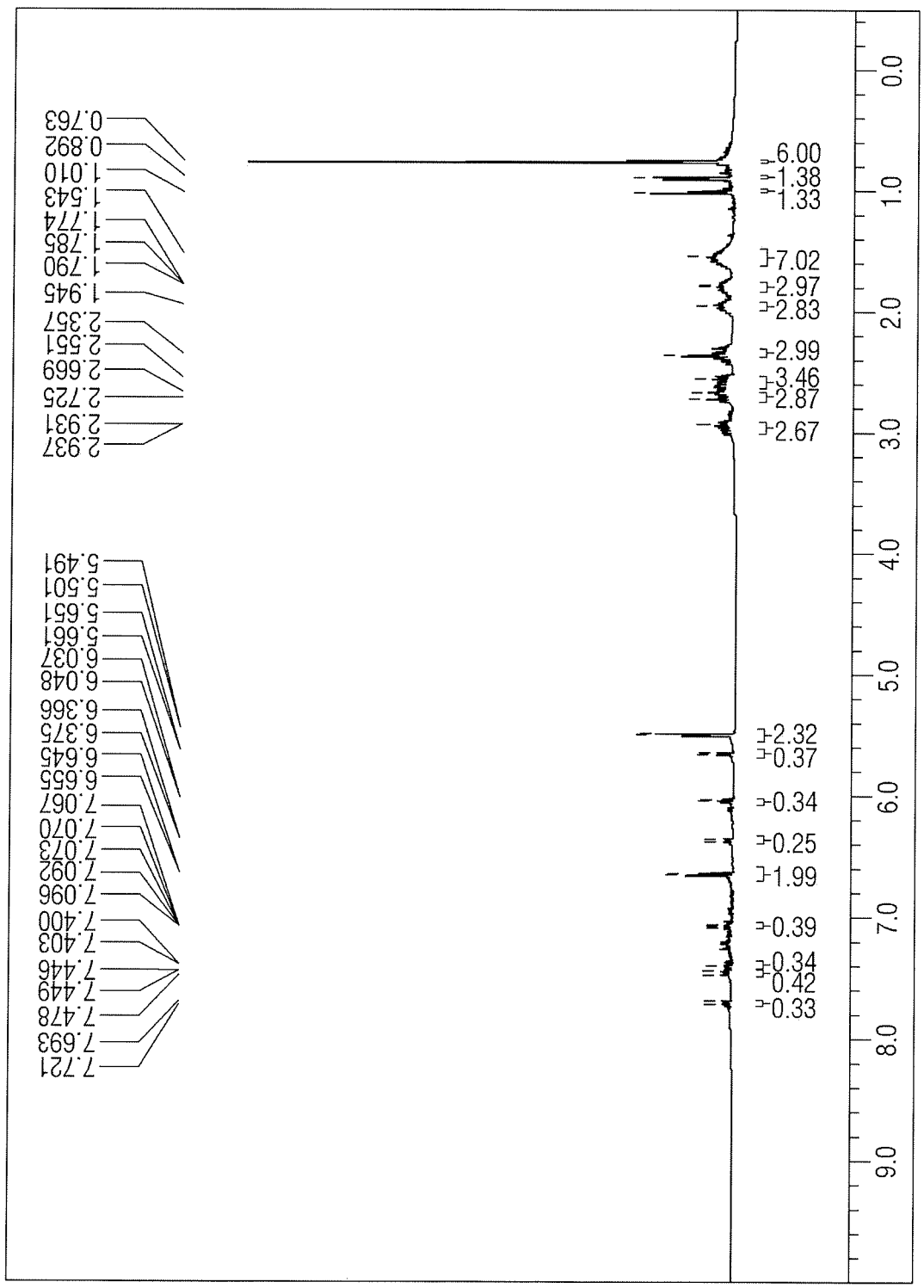
FIG. 2 is a $^1$H-NMR analysis spectrum of a metallocene compound according to a second manufacturing example of the invention.
Figure 3:
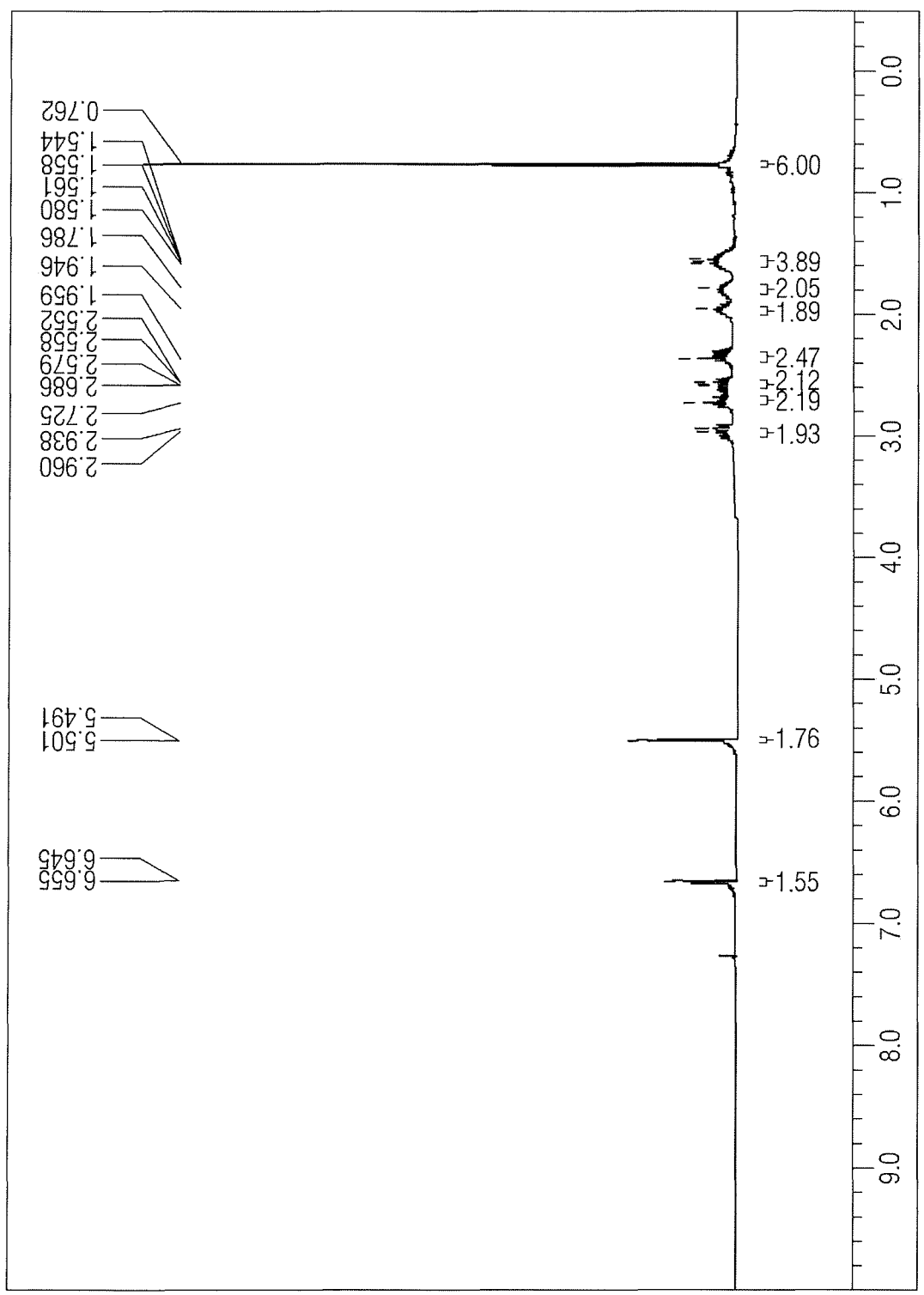
FIG. 3 is a $^1$H-NMR analysis spectrum of the metallocene compound of a first comparative example of the present invention.

The metallocene compounds of Manufacturing Examples 1 and 2 and Comparative Example were analysed, using a nuclear magnetic resonance method. FIG. 1 is a $^1$H-NMR analysis spectrum of a metallocene compound according to a first manufacturing example of the invention. FIG. 2 is a $^1$H-NMR analysis spectrum of a metallocene compound according to a second manufacturing example of the invention. FIG. 3 is a $^1$H analysis spectrum of the metallocene compound of the comparative example of the invention.

Referring to FIG. 1, as a result of $^1$H-NMR analysis, the ratio of Rac-dimethylsilyl (indenyl) (tetrahydroindenyl) zirconium dichloride to Rac-dimethylsilyl bis (tetrahydroindenyl) zirconium dichloride was about 1:1.

Referring to FIG. 2, as a result of $^1$H-NMR analysis, the ratio of Rac-dimethylsilyl (indenyl) (tetrahydroindenyl) zirconium dichloride to Rac-dimethylsilyl bis (tetrahydroindenyl) zirconium dichloride was about 1:3.

Referring to FIG. 3, as a result of $^1$H-NMR analysis, the ratio of Rac-dimethylsilyl (indenyl) (tetrahydroindenyl) zirconium dichloride to Rac-dimethylsilyl bis (tetrahydroindenyl) zirconium dichloride was about 0:1.

Rac-Dimethylsilyl (Indenyl) (Tetrahydroindenyl) Zirconium Dichloride

1H-NMR (CDCl$_3$, 300 MHz) 7.71 (d, 1H), 7.46 (d, 1H), 7.40 (t, 1H), 7.21 (dd, 1H), 7.07 (m, 1H), 6.37 (d, 1H), 6.04 (d, 1H), 5.66 (d, 1H), 3.01-1.45 (8H), 1.01 (s, 3H), 0.89 (s, 3H).

Rac-Dimethylsilyl Bis (Tetrahydroindenyl) Zirconium Dichloride

1H-NMR (CDCl$_3$, 300 MHz) 6.65 (d, 2H), 5.50 (d, 2H), 3.02-2.88 (m, 2H), 2.76-2.50 (m, 4H), 2.38-2.22 (m, 2H), 2.04-1.88 (m, 2H), 1.86-1.70 (m, 2H), 1.64-1.42 (m, 4H), 0.76 (s, 6H).

Manufacturing Example 3

Copolymerization of Ethylene of 1:1 Mixed Catalyst of Rac-Dimethylsilyl (Indenyl) (Tetrahydroindenyl) Zirconium Dichloride and Rac-Dimethylsilyl Bis (Tetrahydroindenyl) Zirconium Dichloride and 1-Hexene Ethylene was fed to a continuous stirring reactor containing hexane and 1-hexene at a pressure of 4 atm and the copolymerization was performed at 80° C. in the presence of 1:1 mixed catalyst of Rac-dimethylsilyl (indenyl) (tetrahydroindenyl) zirconium dichloride and Rac-dimethylsilyl bis (tetrahydroindenyl) zirconium dichloride. Polymerization was performed in a liquid process, while increasing the input amount of 1-hexene to 15 mL, 30 mL, and 45 mL, respectively.

Comparative Example 2

Copolymerization of Ethylene of Rac-Dimethylsilyl Bis (Tetrahydroindenyl) Zirconium Dichloride Single Catalyst and 1-Hexene Ethylene was fed to a continuous stirring reactor containing hexane and 1-hexene at a pressure of 4 atm, and a polymerization was performed at 80° C. in the presence of a single catalyst of Rac-dimethylsilyl bis (tetrahydroindenyl) zirconium dichloride. Polymerization was performed in a liquid process, while increasing the input amount of 1-hexene to 15 mL, 30 mL, and 45 mL.

Experimental Example 2

The catalytic activity and resin density in [Manufacturing Example 3] are arranged in Table 1, and the catalytic activity and the resin density in [Comparative Example 2] are arranged in Table 2.

TABLE 1

| Test | 1-hexene (mL) | catalytic activity (T/mol · h) | resin density |
|---|---|---|---|
| 1 | 15 | 167 | 0.9206 |
| 2 | 30 | 174 | 0.9100 |
| 3 | 45 | 135 | <0.9072 |

TABLE 2

| Test | 1-hexene (mL) | catalytic activity (T/mol · h) | resin density |
|---|---|---|---|
| 1 | 15 | 137 | 0.9243 |
| 2 | 30 | 114 | 0.9171 |
| 3 | 45 | 114 | 0.9096 |

Comparing the polymerization results of [Manufacturing Example 3] and [Comparative Example 2], it was found that, when the polymerization was performed, while gradually increasing the amount of the copolymer under the same polymerization conditions, the mixed catalyst of [Manufacturing Example 3] had the catalytic activity higher than the single catalyst of [Comparative Example 2], and the resin of [Manufacturing Example 3] exhibited a resin density lower than the resin of [Comparative Example 2] under the same polymerization condition (See Tables 1 and 2).

From this result, it was found that, when Rac-dimethylsilyl (indenyl) (tetrahydroindenyl) zirconium dichloride was used, the polymerization activity was further better and the comonomer incorporation was also better.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

The invention claimed is:

1. A preparation method for a metallocene compound, the method comprising:

stirring at least one compound I among compounds expressed by the following chemical formula (I) and a hydrogenation reaction catalyst of 0.10 to 0.55 parts by weight based on 100 parts by weight of the compound I under a hydrogen atmosphere; and obtaining a metallocene compound containing at least one first compound among the compounds expressed by the following chemical formula (1) and at least one second compound among compounds expressed by the following chemical formula (2):

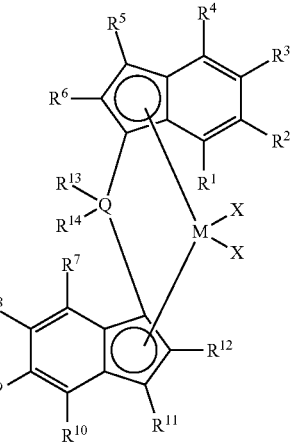

<Chemical Formula (I)>

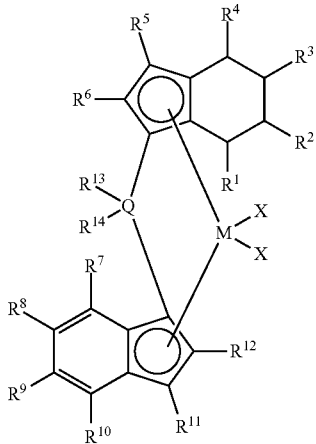

<Chemical Formula (1)>

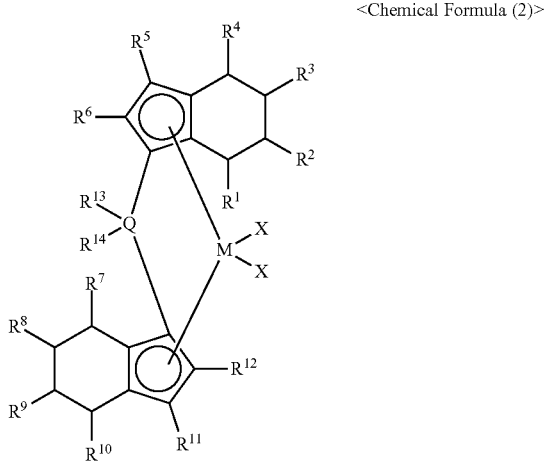

<Chemical Formula (2)> in each of the chemical formula (I), the chemical formula (1) and the chemical formula (2), M is any one of titanium (Ti), zirconium (Zr) or hafnium (Hf);

Q is any one of carbon (C), silicon (Si), germanium (Ge), or tin (Sn);

X is independently any one of halogen, an alkyl group having 1 to 10 carbon atoms, and an alkenyl group having 2 to 10 carbon atoms;

$R^1$, $R^2$, $R^3$, $R^4$, $R^5$, $R^6$, $R^7$, $R^8$, $R^9$, $R^{10}$, $R^{11}$, and $R^{12}$ satisfy the following (i) or (ii), and each of $R^{13}$ and $R^{14}$ is independently an alkyl group having 1 to 10 carbon atoms or an aryl group having 6 to 14 carbon atoms, (i) each of $R^1$, $R^2$, $R^3$, $R^4$, $R^5$, $R^6$, $R^7$, $R^8$, $R^9$, $R^{10}$, $R^{11}$, and $R^{12}$ is independently any one of hydrogen, an alkyl group having 1 to 20 carbon atoms, a cycloalkyl group having 3 to 6 carbon atoms and an aryl group having 6 to 14 carbon atoms, (ii) among $R^m$ (m is an integer of 1 to 12), two adjacent $R^n$ and $R^{n+1}$ (n is an integer from 1 to 11) are connected to each other to form a monocyclic or polycyclic rings having 3 to 15 carbon atoms in which the alkyl group having 1 to 4 carbon atoms is substituted or not substituted, and at this time, the remaining $R^m$ except $R^n$ and $R^{n+1}$ is independently any one of hydrogen, an alkyl group having 1 to 20 carbon atoms, a cycloalkyl group having 3 to 6 carbon atoms and an aryl group having 6 to 14 carbon atoms.

2. The method of claim 1, wherein the alkyl group having 1 to 20 carbon atoms is a hetero alkyl group which has at least one carbon (C) substituted with at least one of oxygen (O), nitrogen (N), and sulfur (S), and the monocyclic ring or polycyclic rings having 3 to 15 carbon atoms are a monocyclic or polycyclic hetero rings having 3 to 15 carbon atoms in which at least one carbon (C) is substituted with at least one of oxygen (O), nitrogen (N), and sulfur (S).

3. The method of claim 1, wherein the hydrogenation reaction catalyst contains at least one metal among nickel (Ni), platinum (Pt), ruthenium (Ru), rhodium (Rh) and palladium (Pd).

4. The method of claim 3, wherein the hydrogenation reaction catalyst is a palladium-carried catalyst in which palladium (Pd) is carried on a carbon carrier.

5. The method of claim 1, wherein stirring of the compound I and the hydrogenation reaction catalyst is performed in an aromatic solvent which is not halogenated.

6. The method of claim 5, wherein the non-halogenated aromatic solvent is at least one of benzene, toluene, xylene, o-xylene, m-xylene, p-xylene, mesitylene, tetralin, anisole, cumene, 1,2-diethylbenzene, 1,3-diethylbenzene, 1,4-diethylbenzene, 1-ethyl-2-methylbenzene, 1-ethyl-3-methylbenzene, and 1-ethyl-4-methylbenzene.

7. The method of claim 1, wherein the metallocene compound further comprises the compound I.

8. A metallocene compound containing at least one first compound among compounds expressed by the following chemical formula (1) and at least one second compound among compounds expressed by the following chemical formula (2):

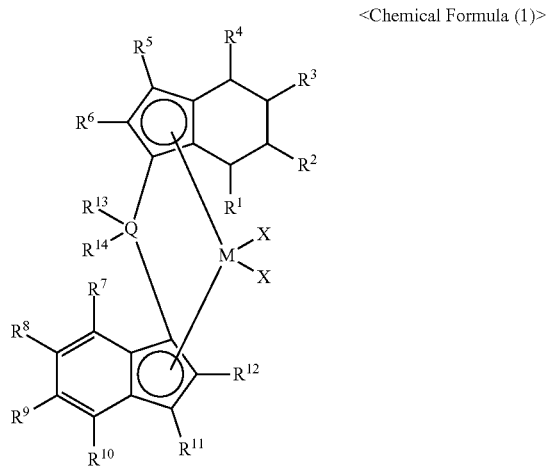

<Chemical Formula (1)>

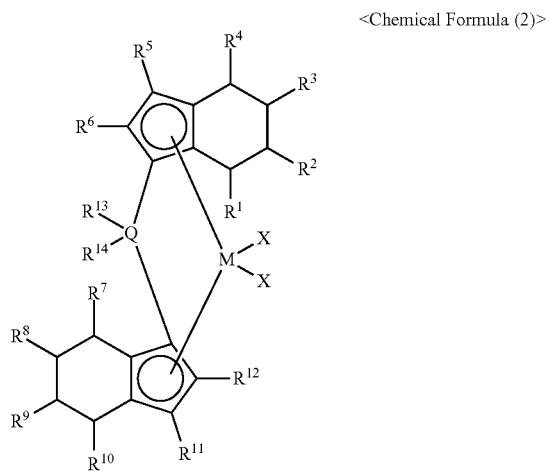

<Chemical Formula (2)> in the chemical formula (1) and the chemical formula (2),

M is any one of titanium (Ti), zirconium (Zr) or hafnium (Hf);

Q is any one of carbon (C), silicon (Si), germanium (Ge), or tin (Sn);

X is independently any one of halogen, an alkyl group having 1 to 10 carbon atoms, and an alkenyl group having 2 to 10 carbon atoms;

$R^1$, $R^2$, $R^3$, $R^4$, $R^5$, $R^6$, $R^7$, $R^8$, $R^9$, $R^{10}$, $R^{11}$, and $R^{12}$ satisfy the following (i) or (ii), and each of $R^{13}$ and $R^{14}$ is independently an alkyl group having 1 to 10 carbon atoms or an aryl group having 6 to 14 carbon atoms, (i) each of $R^1$, $R^2$, $R^3$, $R^4$, $R^5$, $R^6$, $R^7$, $R^8$, $R^9$, $R^{10}$, $R^{11}$, and $R^{12}$ is independently any one of hydrogen, an alkyl group having 1 to 20 carbon atoms, a cycloalkyl group having 3 to 6 carbon atoms and an aryl group having 6 to 14 carbon atoms, (ii) among $R^m$ (m is an integer of 1 to 12), two adjacent $R^n$ and $R^{n+1}$ (n is an integer from 1 to 11) are connected to each other to form a monocyclic or polycyclic rings having 3 to 15 carbon atoms in which the alkyl group having 1 to 4 carbon atoms is substituted or not substituted, and at this time, the remaining $R^m$ except $R^n$ and $R^{n+1}$ is independently any one of hydrogen, an alkyl group having 1 to 20 carbon atoms, a cycloalkyl group having 3 to 6 carbon atoms and an aryl group having 6 to 14 carbon atoms.

9. The metallocene compound of claim 8, further comprising:

at least one compound I among compounds expressed by the following chemical formula (I):

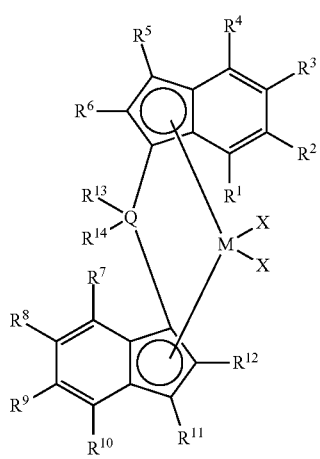

<Chemical Formula (I)> in the chemical formula (I),

M is any one of titanium (Ti), zirconium (Zr) or hafnium (Hf);

Q is any one of carbon (C), silicon (Si), germanium (Ge), or tin (Sn);

X is independently any one of halogen, an alkyl group having 1 to 10 carbon atoms, and an alkenyl group having 2 to 10 carbon atoms;

$R^1$, $R^2$, $R^3$, $R^4$, $R^5$, $R^6$, $R^7$, $R^8$, $R^9$, $R^{10}$, $R^{11}$, and $R^{12}$ satisfy the following (i) or (ii), and each of $R^{13}$ and $R^{14}$ is independently an alkyl group having 1 to 10 carbon atoms or an aryl group having 6 to 14 carbon atoms, (i) each of $R^1$, $R^2$, $R^3$, $R^4$, $R^5$, $R^6$, $R^7$, $R^8$, $R^9$, $R^{10}$, $R^{11}$, and $R^{12}$ is independently any one of hydrogen, an alkyl group having 1 to 20 carbon atoms, a cycloalkyl group having 3 to 6 carbon atoms and an aryl group having 6 to 14 carbon atoms, (ii) among $R^m$ (m is an integer of 1 to 12), two adjacent $R^n$ and $R^{n+1}$ (n is an integer from 1 to 11) are connected to each other to form a monocyclic or polycyclic rings having 3 to 15 carbon atoms in which the alkyl group having 1 to 4 carbon atoms is substituted or not substituted, and at this time, the remaining $R^m$ except $R^n$ and $R^{n+1}$ is independently any one of hydrogen, an alkyl group having 1 to 20 carbon atoms, a cycloalkyl group having 3 to 6 carbon atoms and an aryl group having 6 to 14 carbon atoms.

10. The metallocene compound of claim 8, wherein the first compound is at least one of the compounds expressed by the following chemical formulas (3) to (18):

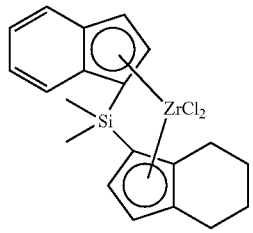

<Chemical Formula (3)>

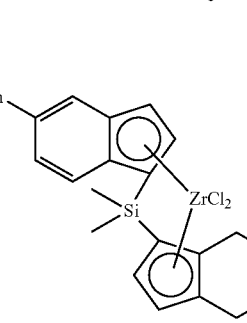

<Chemical Formula (4)>

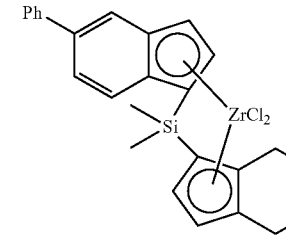

<Chemical Formula (5)>

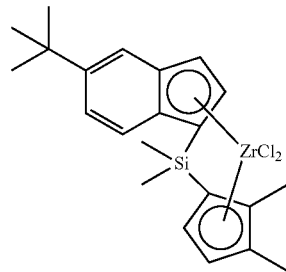

<Chemical Formula (6)>

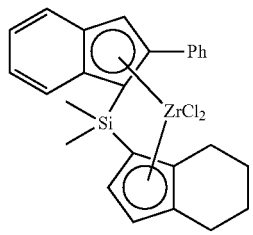

<Chemical Formula (7)>

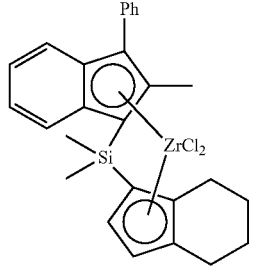

<Chemical Formula (8)>
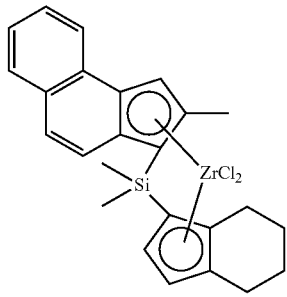
<Chemical Formula (9)>
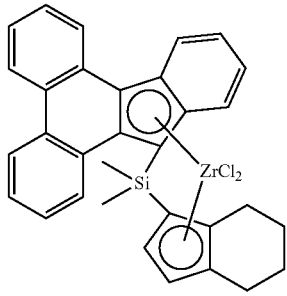
<Chemical Formula (10)>
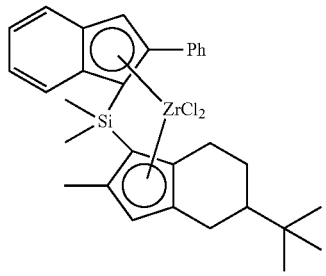
<Chemical Formula (11)>
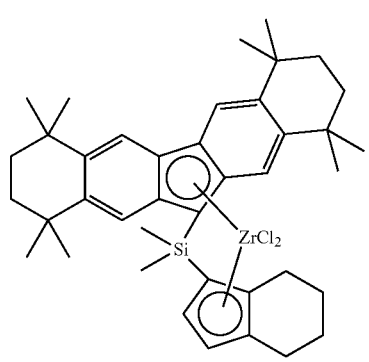
<Chemical Formula (12)>
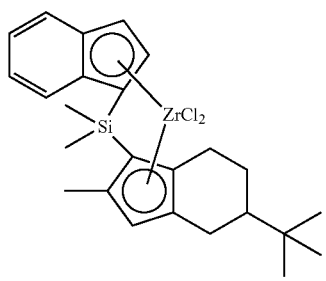
<Chemical Formula (13)>
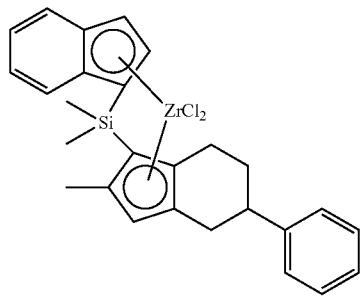
<Chemical Formula (14)>
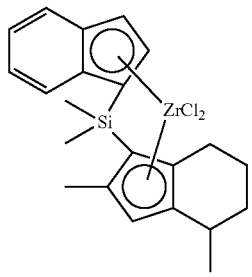
<Chemical Formula (15)>
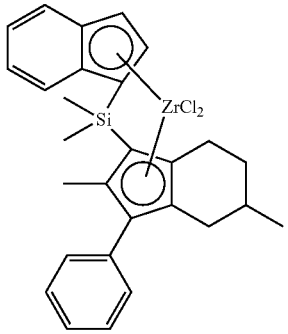
<Chemical Formula (16)>
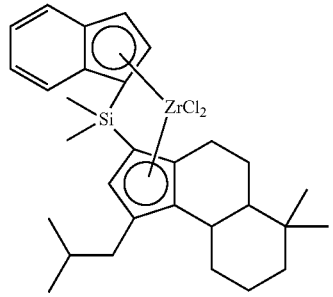
<Chemical Formula (17)>
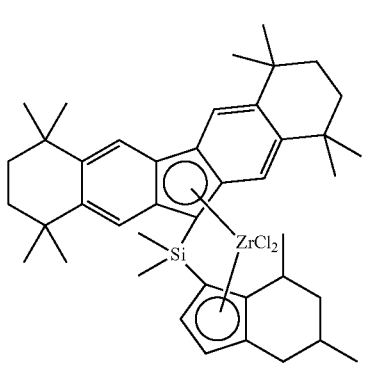

<Chemical Formula (18)>
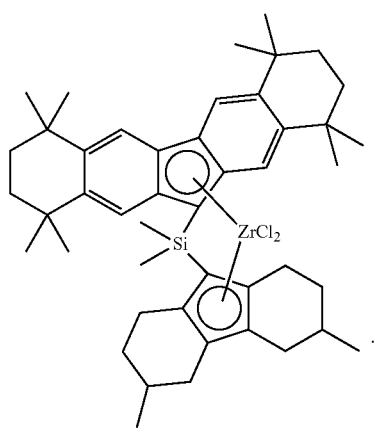
11. The metallocene compound of claim 9, wherein the compound I is at least one of the compounds expressed by the following chemical formulas (19) to (34):
<Chemical Formula (19)>
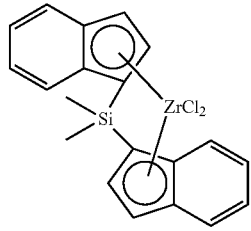
<Chemical Formula (20)>
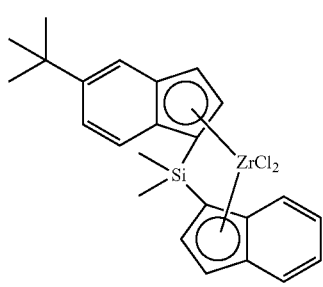
<Chemical Formula (21)>
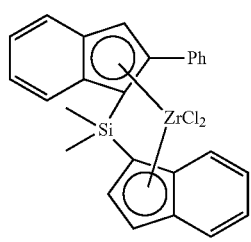
<Chemical Formula (22)>
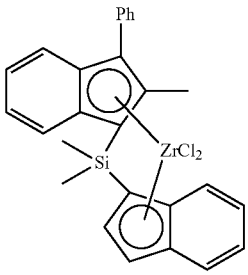
<Chemical Formula (23)>
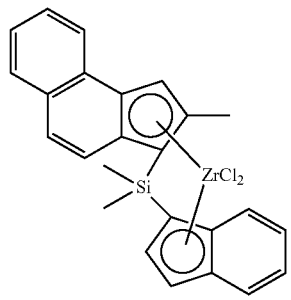
<Chemical Formula (24)>
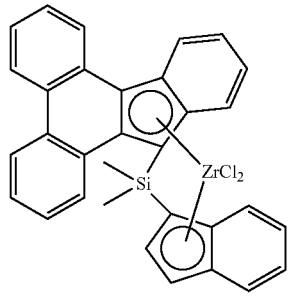
<Chemical Formula (25)>
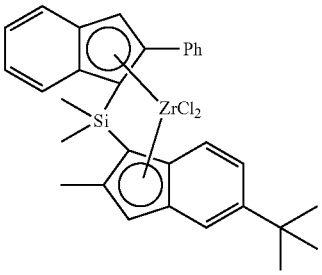
<Chemical Formula (26)>
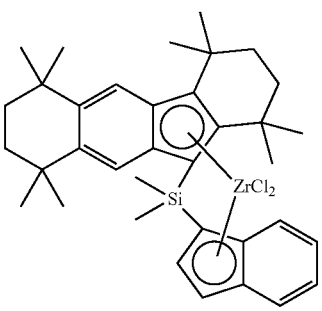
<Chemical Formula (27)>

-continued
<Chemical Formula (28)>
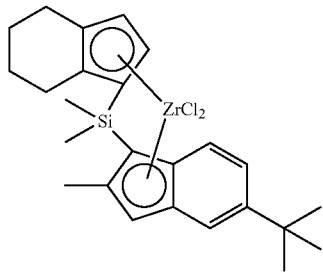
<Chemical Formula (29)>
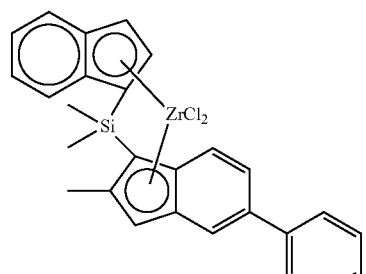
<Chemical Formula (30)>
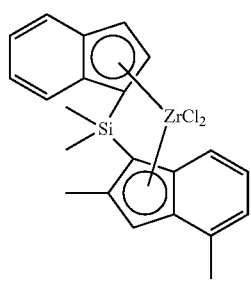
<Chemical Formula (31)>
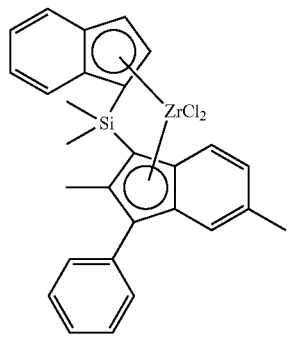
<Chemical Formula (32)>
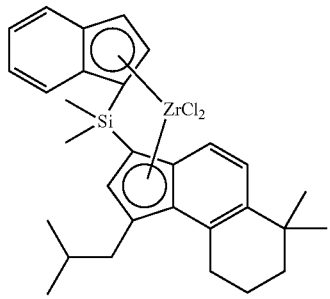
-continued
<Chemical Formula (33)>
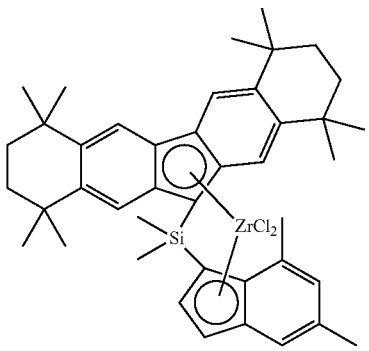
<Chemical Formula (34)>
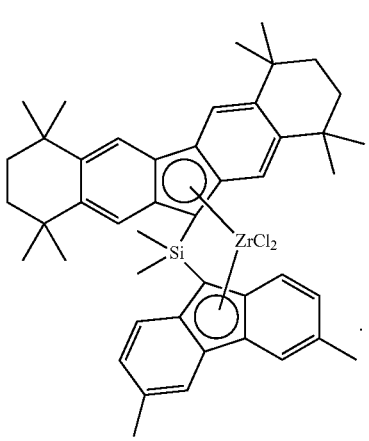
12. The metallocene compound of claim 8, wherein the second compound is at least one of the compounds expressed by the following chemical formulas (35) to (50):
<Chemical Formula (35)>
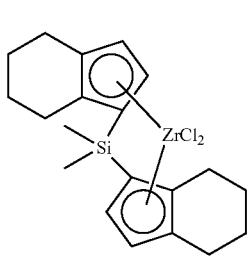
<Chemical Formula (36)>
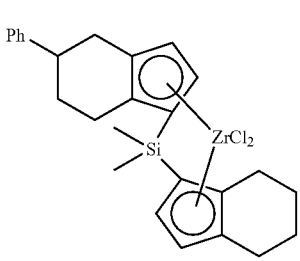

<Chemical Formula (37)>
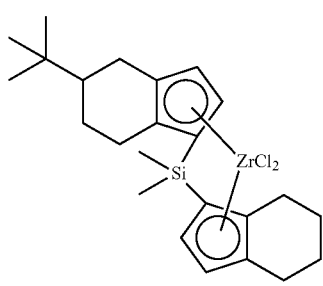
<Chemical Formula (38)>
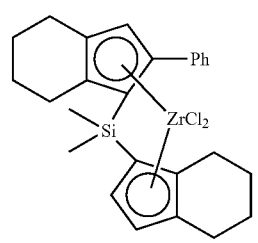
<Chemical Formula (39)>
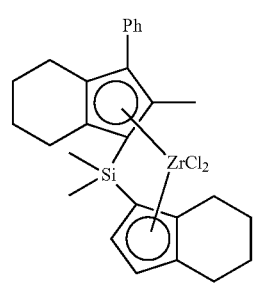
<Chemical Formula (40)>
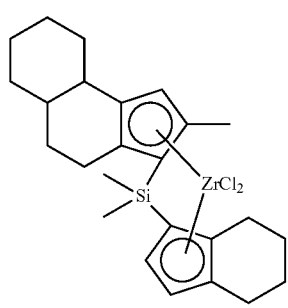
<Chemical Formula (41)>
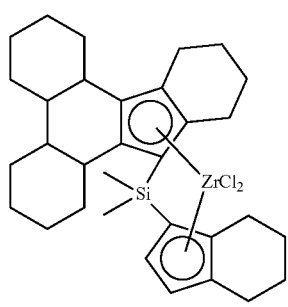
<Chemical Formula (42)>
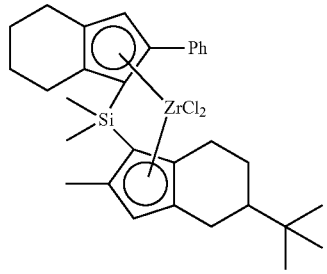
<Chemical Formula (43)>
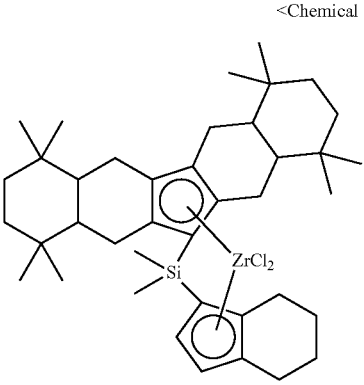
<Chemical Formula (44)>
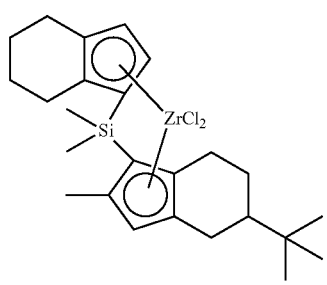
<Chemical Formula (45)>
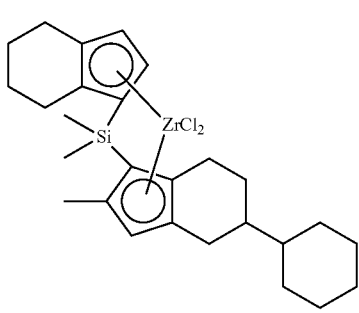
<Chemical Formula (46)>
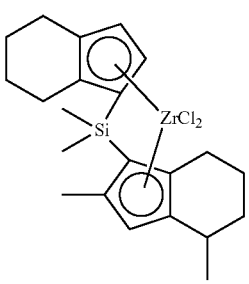

<Chemical Formula (47)>

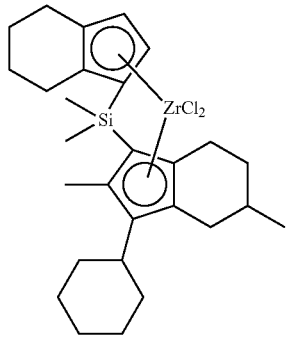

<Chemical Formula (48)>

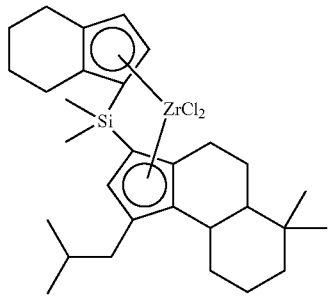

<Chemical Formula (49)>

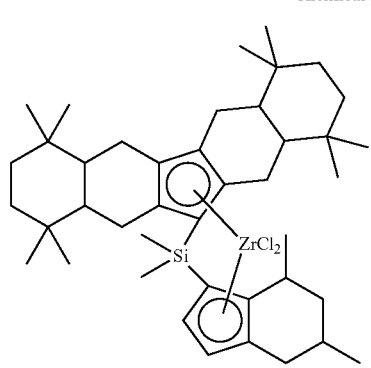

<Chemical Formula (50)>

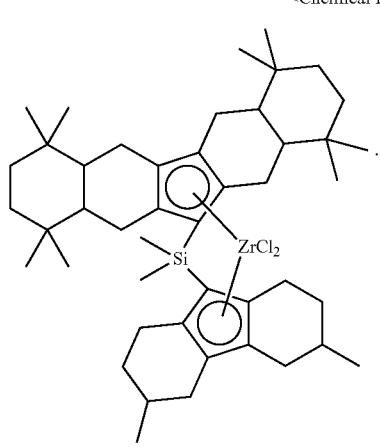

13. The metallocene compound of claim 8, wherein the alkyl group having 1 to 20 carbon atoms is a heteroalkyl group having 1 to 20 carbon atoms in which at least one carbon (C) is substituted with any one of nitrogen (N), oxygen (O) and sulfur (S), and a monocyclic or a polycyclic rings having 3 to 15 carbon atoms is a monocyclic or polycyclic hetero rings in which at least one carbon (C) is substituted with any one of nitrogen (N), oxygen (O) and sulfur (S).

14. The metallocene compound of claim 13, wherein the first compound is at least one of the compounds expressed by the following chemical formulas (51) to (54):

<Chemical Formula (51)>

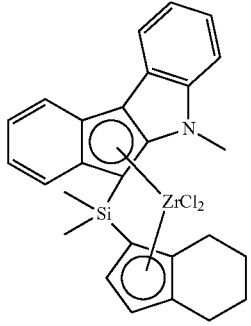

<Chemical Formula (52)>

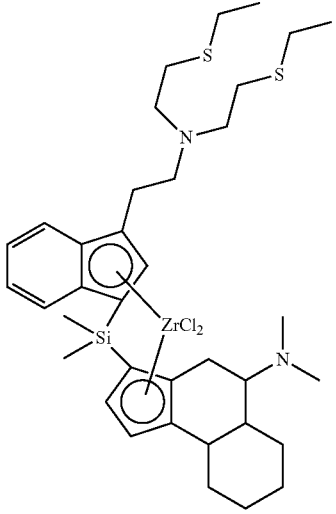

<Chemical Formula (53)>

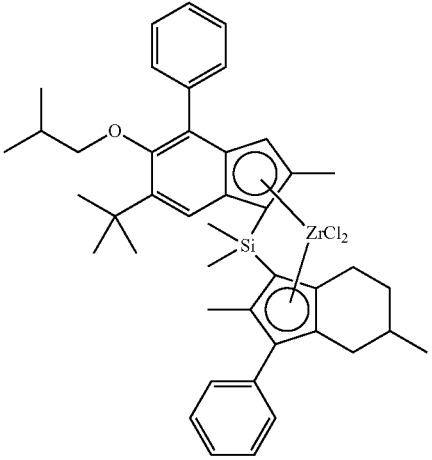

<Chemical Formula (54)>

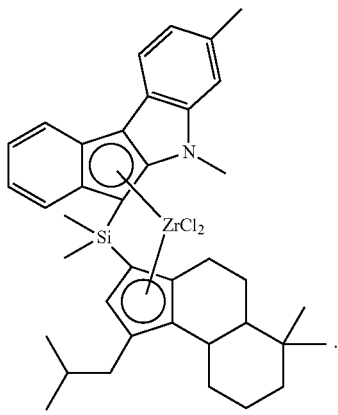

15. The metallocene compound of claim 9, wherein the alkyl group having 1 to 20 carbon atoms is a heteroalkyl group having 1 to 20 carbon atoms in which at least one carbon (C) is substituted with any one of nitrogen (N), oxygen (O) and sulfur (S), and a monocyclic or a polycyclic rings having 3 to 15 carbon atoms is a monocyclic or polycyclic hetero rings in which at least one carbon (C) is substituted with any one of nitrogen (N), oxygen (O) and sulfur (S).

16. A preparation method for a metallocene compound, the method comprising:
   stirring at least one compound I among compounds expressed by the following chemical formula (I) and a hydrogenation reaction catalyst of 0.10 to 0.55 parts by weight based on 100 parts by weight of the compound I under a hydrogen atmosphere; and
   obtaining a metallocene compound containing at least one first compound among the compounds expressed by the following chemical formula (1):

<Chemical Formula (I)>

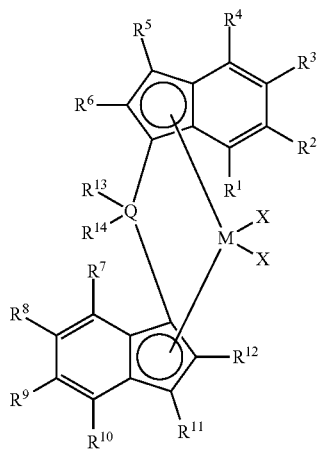

<Chemical Formula (1)>

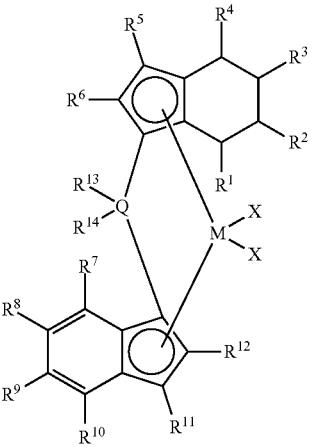

in each of the chemical formula (I) and the chemical formula (1),

M is any one of titanium (Ti), zirconium (Zr) or hafnium (Hf);

Q is any one of carbon (C), silicon (Si), germanium (Ge), or tin (Sn);

X is independently any one of halogen, an alkyl group having 1 to 10 carbon atoms, and an alkenyl group having 2 to 10 carbon atoms;

$R^1, R^2, R^3, R^4, R^5, R^6, R^7, R^8, R^9, R^{10}, R^{11}$ and $R^{12}$ satisfy the following (i) or (ii), and each of $R^{13}$ and $R^{14}$ is independently an alkyl group having 1 to 10 carbon atoms or an aryl group having 6 to 14 carbon atoms, (i) each of $R^1, R^2, R^3, R^4, R^5, R^6, R^7, R^8, R^9, R^{10}, R^{11}$, and $R^{12}$ is independently any one of hydrogen, an alkyl group having 1 to 20 carbon atoms, a cycloalkyl group having 3 to 6 carbon atoms and an aryl group having 6 to 14 carbon atoms, (ii) among $R^m$ (m is an integer of 1 to 12), two adjacent $R^n$ and $R^{n+1}$ (n is an integer from 1 to 11) are connected to each other to form a monocyclic or polycyclic rings having 3 to 15 carbon atoms in which the alkyl group having 1 to 4 carbon atoms is substituted or not substituted, and at this time, the remaining $R^m$ except $R^n$ and $R^{n+1}$ is independently any one of hydrogen, an alkyl group having 1 to 20 carbon atoms, a cycloalkyl group having 3 to 6 carbon atoms and an aryl group having 6 to 14 carbon atoms, wherein the compound I is at least one of the compounds expressed by the following chemical formulas (55) to (58):

<Chemical Formula (55)>

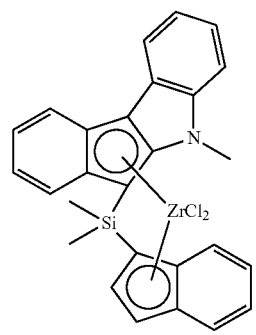

<Chemical Formula (56)>

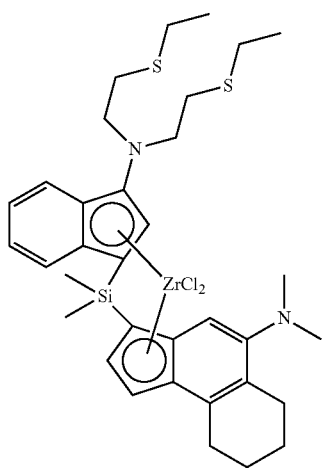

<Chemical Formula (57)>

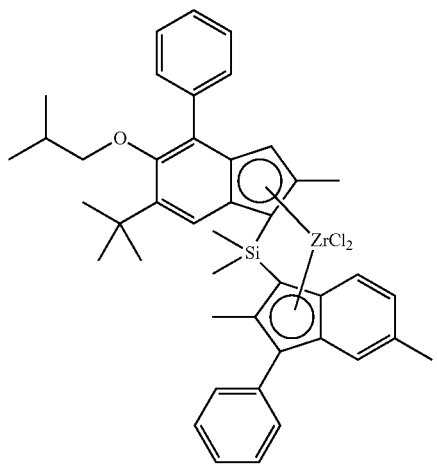

<Chemical Formula (58)>

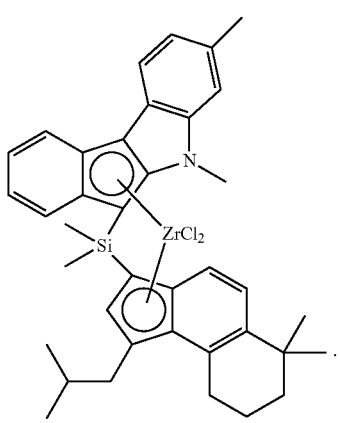

17. The metallocene compound of claim 8, wherein the alkyl group having 1 to 20 carbon atoms is a heteroalkyl group having 1 to 20 carbon atoms in which at least one carbon (C) is substituted with any one of nitrogen (N), oxygen (O) and sulfur (S), and a monocyclic or a polycyclic rings having 3 to 15 carbon atoms is a monocyclic or polycyclic hetero rings in which at least one carbon (C) is substituted with any one of nitrogen (N), oxygen (O) and sulfur (S).

18. A metallocene compound containing at least one first compound among compounds expressed by the following chemical formula (1):

<Chemical Formula (1)>

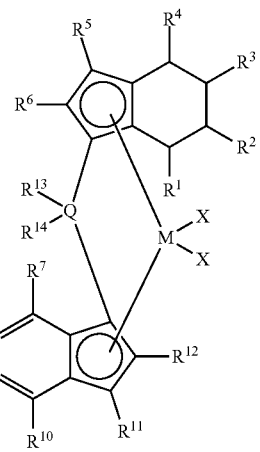

in the chemical formula (1),

M is any one of titanium (Ti), zirconium (Zr) or hafnium (Hf);

Q is any one of carbon (C), silicon (Si), germanium (Ge), or tin (Sn);

X is independently any one of halogen, an alkyl group having 1 to 10 carbon atoms, and an alkenyl group having 2 to 10 carbon atoms;

$R^1$, $R^2$, $R^3$, $R^4$, $R^5$, $R^6$, $R^7$, $R^8$, $R^9$, $R^{10}$, $R^{11}$, and $R^{12}$ satisfy the following (i) or (ii), and each of $R^{13}$ and $R^{14}$ is independently an alkyl group having 1 to 10 carbon atoms or an aryl group having 6 to 14 carbon atoms;

(i) each of $R^1$, $R^2$, $R^3$, $R^4$, $R^5$, $R^6$, $R^7$, $R^8$, $R^9$, $R^{10}$, $R^{11}$, and $R^{12}$ is independently any one of hydrogen, an alkyl group having 1 to 20 carbon atoms, a cycloalkyl group having 3 to 6 carbon atoms and an aryl group having 6 to 14 carbon atoms;

(ii) among $R^m$ (m is an integer of 1 to 12), two adjacent $R^n$ and $R^{n+1}$ (n is an integer from 1 to 11) are connected to each other to form a monocyclic or polycyclic rings having 3 to 15 carbon atoms in which the alkyl group having 1 to 4 carbon atoms is substituted or not substituted, and at this time, the remaining $R^m$ except $R^n$ and $R^{n+1}$ is independently any one of hydrogen, an alkyl group having 1 to 20 carbon atoms, a cycloalkyl group having 3 to 6 carbon atoms and an aryl group having 6 to 14 carbon atoms, and a second compound is at least one of the compounds expressed by the following chemical formulas (59) to (62):

<Chemical Formula (59)>
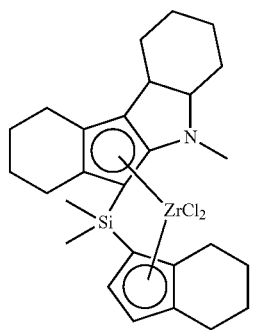
<Chemical Formula (60)>
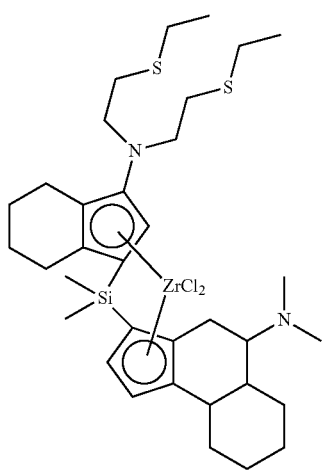
<Chemical Formula (61)>
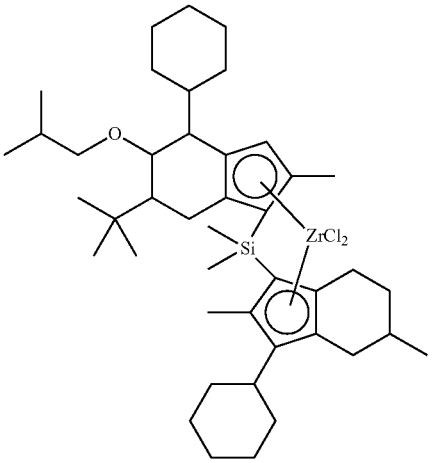
<Chemical Formula (62)>
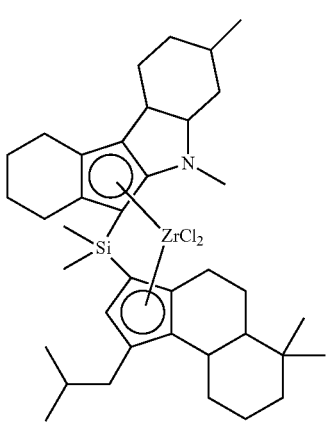
* * * * *